July 21, 1959  J. H. REID  2,895,347
AUTOMATIC LOCKING CONTROL
Filed May 13, 1957   2 Sheets-Sheet 1

INVENTOR.
JAMES H. REID, Deceased
by MARGUERITE L. REID,
Administratrix
BY Townsend and Townsend
ATTORNEYS

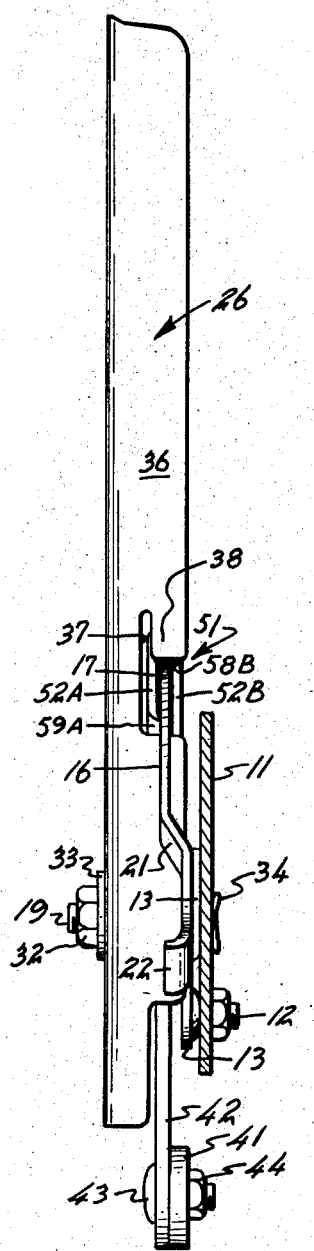
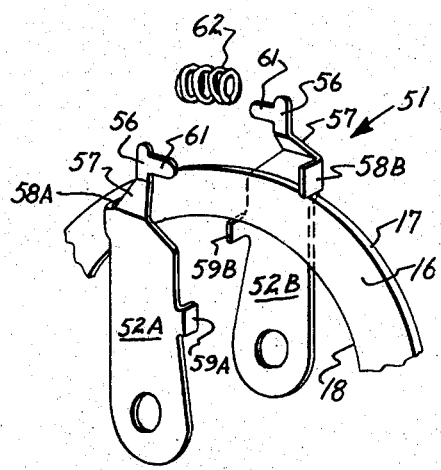
Fig. 3
Fig. 4
INVENTOR.
JAMES H. REID, Deceased,
by MARGUERITE L. REID
Administratrix
BY
Townsend and Townsend
ATTORNEYS United States Patent Office 2,895,347
Patented July 21, 1959

2,895,347

AUTOMATIC LOCKING CONTROL

James H. Reid, deceased, late of Los Angeles County, Calif., by Marguerite L. Reid, administratrix, Los Angeles County, Calif.

Application May 13, 1957, Serial No. 658,882

8 Claims. (Cl. 74—531)

This invention relates to a new and improved automatic locking control. More particularly the invention relates to a locking control for such devices as throttles where it is desired to lock the control against vibration and forces transmitted from the linkage leading from the control to the throttle. Reference is made to Patent No. 2,703,499 of which the present invention constitutes an improvement.

One of the principal features and advantages of the present invention is the simplicity of construction of the locking control hereinafter described as compared with controls as exemplified by Patent No. 2,703,499. The constructions shown in said patent are intended primarily for aircraft use, whereas the present invention may be used in locations where it is not subjected to as severe vibration and stress. Accordingly the present invention may be used in situations where there is vibration and stress, but not as severe vibrations and stresses as encountered in aircraft uses and the like. A typical example of the use of the present invention is in the throttle controls for agricultural tractors and for industrial uses.

The present invention comprises an assembly composed of elements which are inexpensive to manufacture, inasmuch as they may be made by metal stamping and hence can be produced in quantity at low cost.

Still another feature of the invention is the fact that machining operations required to fabricate the present invention are simple and reduced to a minimum.

Other objects of the present invention will become apparent upon reading the following specification and referring to the accompanying drawings in which similar characters of reference represent corresponding parts in each of the several views.

In the drawings:

Fig. 3 is a side elevation; and

Fig. 4 is an exploded perspective view of certain parts of the structure.

Figure 1:
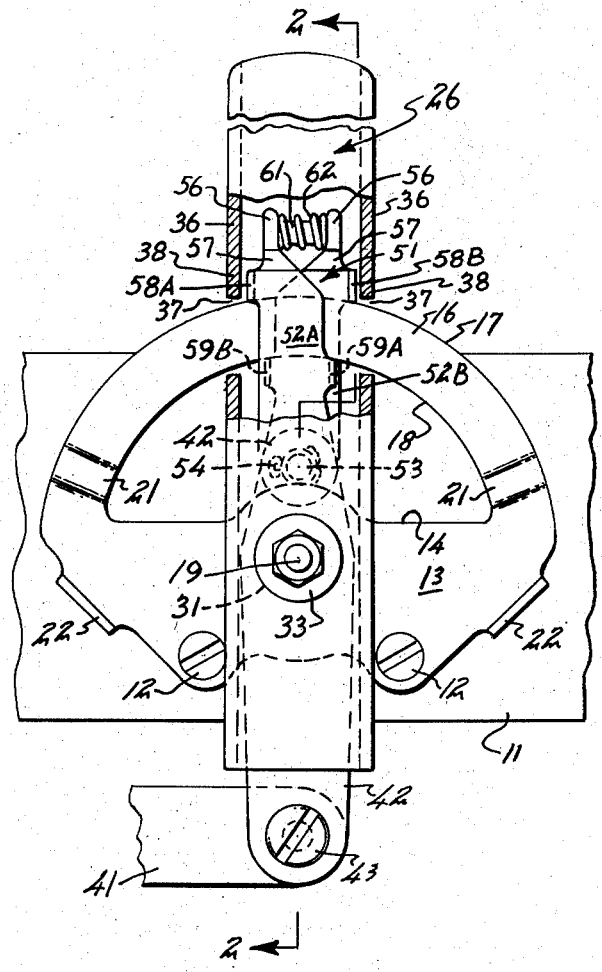
Fig. 1 is a front elevation of a throttle control constructed in accordance with this invention with parts broken away to reveal interior construction.
Figure 2:
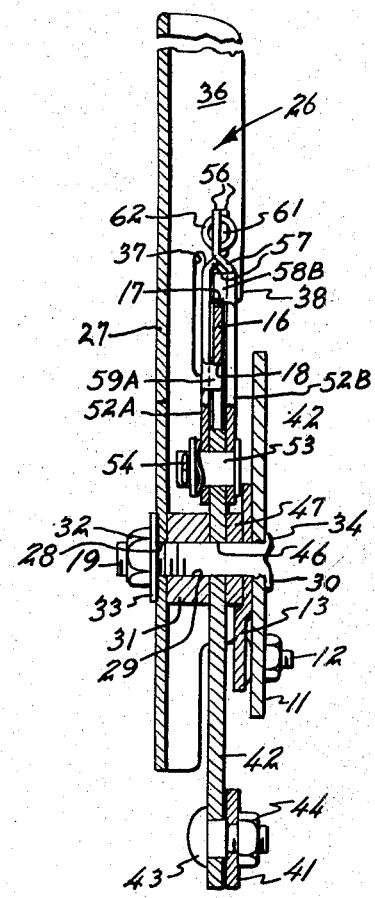
Fig. 2 is a longitudinal vertical sectional view taken substantially along line 2—2 of Fig. 1.

The mechanism hereinafter described is mounted on a base plate 11 which may be attached to a tractor body or other suitable structure. Attached to base plate 11 by screws 12 is a truncated sector-shaped base 13 cut away by aperture 14 to provide at its upper end a quadrant-shaped lock bar 16, the top and bottom edges 17 and 18 of which, respectively, are circular arcs having their common center of curvature at stud or pin 19. The central portion of quadrant-shaped bar 16 is offset forwardly from base 13, being joined thereto by oblique connecting portions 21. The ends of base 13 are bent to form upturned stops 22, limiting pivotal movement of the throttle or other control, as hereinafter appears.

Throttle control handle 26 is stamped from a flat piece of metal in the form of a channel. The base 27 of the channel is formed with aperture 28. Stud 19 passes through aperture 28 and carries spacer washer 31. Nut 32 is threaded on stud 19 and holds washer 33 against handle 26. Stud 19 also passes through an aperture in base plate 11 and base 13 and is held in position by enlarged head 30. This construction pivotally mounts throttle handle 26 about the axis of stud 19. The sides 36 of the throttle channel are cut away in an irregular shaped aperture 37 to provide clearance for quadrant bar 16 and have depending unlatching lugs 38.

The device may be employed to control the setting of a carburetor throttle or the like (not shown), it being understood that link 41 extends to such throttle or other device with as many intermediate members interposed as may be required. Link 41 is pivotally attached to the lower end of secondary control bar 42 by means of screw 43 and nut 44. The upper end of bar 42 is formed with an aperture 46 and through the aperture extends stud 19. Spacer washer 47 is interposed between bar 42 and base 13. When the control is unlocked, as hereinafter described, the operator, by pivoting handle 36, causes pivotal movement of secondary bar 42. The width of bar 42 is slightly less than the distance between sides 36 of handle 26, the space between the side edges of bar 42 and the inner edges of sides 36 providing clearance for unlocking of the control.

A shoe assembly 51 is provided consisting of a pair of shoe bearing members 52A and 52B, the lower ends of which overlap and are pivoted to each other and to the upper end of secondary bar 42 by means of pivot pin 53, held in place by cotter pin 54. It will be noted that pin 53 is located above stud 19 and hence shoe bearing members 52A and 52B pivot about a shorter radius than throttle handle 26 and secondary bar 42.

Each shoe bearing member 52 is formed by stamping a flat piece of metal to form a laterally offset portion 56 at the top, connected to the lower portion by an oblique portion 57. Member 52A is mounted in front of bar 42 and also in front of quadrant bar 16 while member 52B is mounted behind bars 42 and 16, but the top portions 56 of both members are substantially directly opposed. Each shoe bearing member is formed with a pair of perpendicularly bent shoes 58 and 59 located on the top and bottom edges of quadrant bar 16, respectively, the shoes of member 52A being designated 58A and 59A and the shoes of member 52B being designated 58B and 59B. It will be seen that the shoes of each member are on diagonally opposite sides. Each offset portion 56 is formed with an inwardly extending ear 61 surrounded by helical spring 62 bearing against the two offset portions 56 and biasing the same apart. The force of spring 62 causes the shoes to frictionally engage the top and bottom edges of quadrant bar 16, thereby locking shoe assembly 51 and quadrant bar 16 together. Unlatching lugs 38 on handle 26 are adjacent upper shoes 58 and when handle 26 is pivoted, lugs 38 contact shoes 58, causing shoe bearing member 52 to pivot about pin 53, thus unlatching the control.

Accordingly, in operation, when handle 26 is at rest, vibration and force applied on the lower end of bar 42 cannot change the throttle setting for the reason that spring 62 causes shoes 58 and 59 frictionally to engage quadrant bar 16 edges 17 and 18. The theoretical basis for such engagement and the subsequent disengagement of the shoes is essentially the same as that set forth in said Patent No. 2,703,499 and need not here be repeated.

When the operator desires to change the throttle setting, he pivots handle 26 about axis 19 as a center in the desired direction. Such movement first causes one of unlatching lugs 38 of handle 26 to contact one of shoe bearing members 52 in the region of its upper shoe 58. Such contact causes the shoe bearing member 52 to pivot about pin 53, thereby unlocking shoe assembly 51 from quadrant bar 16. Continued movement in such direction causes sides 36 of handle 26 to engage the side edges of bar 42 and move the same to the new setting. Upon release of handle 26, spring 62 causes shoes 58 and 59 again to engage quadrant bar 16 and lock the control in place.

Although the foregoing invention has been described in some detail by way of illustration and example for purposes of clarity of understanding, it is understood that certain changes and modifications may be practiced within the spirit of the invention and scope of the appended claims.

What is claimed is:

1. In a locking control apparatus first means forming a first bar, a control handle, a secondary bar, second means independently pivotally mounting said control handle and secondary bar on said first means about a common center, and a locking structure pivotally mounted on said secondary bar about a center between said second means and said first bar, said locking structure comprising a pair of shoe-bearing members each formed from a flat piece of material, one said shoe-bearing member being positioned on one side of said secondary bar and on one side of said first bar and the other said shoe-bearing member being positioned on the opposite side of said secondary bar and said first bar, each said shoe-bearing member being formed to provide two shoes, each said shoe being an integral extension of its respective shoe-bearing member bent transversely of said first bar, one said shoe of each said shoe-bearing member engaging the top edge of said first bar and the other said shoe engaging the underside of said first bar, the upper shoe of one said shoe-bearing member being opposite the lower shoe of the other shoe-bearing member and vice versa, and means biasing said shoes toward engagement with said first bar.

2. In a locking control apparatus first means forming a first bar, a control handle, a secondary bar, second means independently pivotally mounting said control handle and secondary bar on said first means about a common center, and a locking structure pivotally mounted on said secondary bar about a center between said second means and said first bar, said locking structure comprising a pair of shoe- bearing members each formed from a flat piece of material, one said shoe-bearing member being positioned on one side of said secondary bar and on one side of said first bar and the other said shoe-bearing member being positioned on the opposite side of said secondary bar and said first bar, each said shoe-bearing member being formed to provide two shoes, each said shoe being an integral extension of its respective shoe-bearing member bent transversely of said first bar, one said shoe of each said shoe-bearing member engaging the top edge of said first bar and the other said shoe engaging the underside of said first bar, the upper shoe of one said shoe-bearing member being opposite the lower shoe of the other shoe-bearing member and vice versa, said shoe-bearing members each being formed with a laterally offset extension, at least one said extension being formed with an ear projecting toward the other said extension, and a spring on said ears biasing said extensions apart and biasing said shoes toward engagement with said first bar.

3. In a locking control apparatus, first means forming a quadrant-shaped first bar, a channel-shaped control handle, a secondary bar loosely fitting within at least a portion of the channel of said control handle, second means independently pivotally mounting said control handle and said secondary bar on said first means about a common center, the sides of said control handle being apertured to provide clearance for said first bar, said first bar extending through the apertures in said control handle, and a locking structure pivotally mounted on said secondary bar intermediate said secondary means and said first bar, said locking structure comprising a pair of shoe-bearing members each having a first shoe engaging the top edge of said first bar and a second shoe engaging the bottom edge of said first bar, the first shoe of one shoe bearing member being opposite the second shoe of the other shoe bearing member and vice versa, said shoe-bearing members being disposed within the channel portion of said control handle in closer proximity to the inner side edges of said control handle than the side edges of said secondary bar whereby upon pivotal movement of said control handle about said first means, one of the sides of said control handle first contacts one of said shoe-bearing members to disengage said shoe-bearing member from locking contact with said first bar and upon continued movement of said control handle said control handle contacts and moves said secondary bar.

4. In a locking control apparatus, first means forming a quadrant-shaped first bar, a channel-shaped control handle, a secondary bar loosely fitting within at least a portion of the channel of said control handle, second means independently pivotally mounting said control handle and said secondary bar on said first means about a common center, the sides of said control handle being apertured to provide clearance for said first bar, said first bar extending through the apertures in said control handle, and a locking structure pivotally mounted on said secondary bar intermediate said second means and said first bar, said locking structure comprising a pair of shoe-bearing members each having a first shoe engaging the top edge of said first bar and a second shoe engaging the bottom edge of said first bar, the first shoe of one shoe bearing member being opposite the second shoe of the other shoe bearing member and vice versa, said shoe-bearing members being disposed within the channel portion of said control handle in closer proximity to the inner side edges of said control handle than the side edges of said secondary bar whereby upon pivotal movement of said control handle about said first means, one of the sides of said control handle first contacts one of said shoe-bearing members to disengage said shoe-bearing member from locking contact with said first bar and upon continued movement of said control handle said control handle contacts and moves said secondary bar and means biasing said shoes toward engagement with said first bar.

5. In a locking control device first means forming a first bar, a channel-shaped control handle, a secondary bar, a pin pivotally mounting said control handle and said secondary bar on said first means independently of each other, the axis of said pin being perpendicular to the direction of the lengths of said control handle and secondary bar, and a locking structure pivotally mounted on said secondary bar intermediate said pin and said first bar, said locking structure comprising a pair of shoe-bearing members each formed from a flat piece of material, one said shoe-bearing member being positioned on one side of said secondary bar and on one side of said first bar and the other said shoe-bearing member being positioned on the opposite side of said secondary bar and said first bar, each said shoe-bearing member being formed to provide two shoes, each said shoe being an integral extension of its respective shoe-bearing member bent transversely of said first bar, one said shoe of each said shoe-bearing member engaging the top edge of said first bar and the other said shoe engaging the underside of said first bar, the upper shoe of one said shoe-bearing member being opposite the lower shoe of the other shoe-bearing member and vice versa, and means biasing said shoes toward engagement with said first bar.

6. In a locking control device first means forming a first bar, a channel-shaped control handle, a secondary bar, a pin pivotally mounting said control handle and said secondary bar on said first means independently of each other, the axis of said pin being perpendicular to the direction of the lengths of said control handle and secondary bar, and a locking structure pivotally mounted on said secondary bar intermediate said pin and said first bar, said locking structure comprising a pair of shoe-bearing members each having a first shoe engaging the top edge of said first bar and a second shoe engaging the bottom edge of said first bar, the first shoe of one locking element being opposite the second shoe of the other locking element and vice versa, said shoe-bearing members being disposed within the channel portion of said control handle in closer proximity to the inner side edges of said control handle than the side edges of said secondary bar whereby upon pivotal movement of said control handle about said first means, one of the sides of said control handle first contacts one of said shoe-bearing members to disengage said shoe-bearing member from locking contact with said first bar and upon continued movement of said control handle said control handle contacts and moves said secondary bar.

7. In a locking control apparatus, a bar, a locking structure movable on said bar, means for always locking said structure against forces tending to move it acting from one side of the bar, said means also automatically releasing said structure for movement from forces on the other side of the bar, said means including a pair of pivoted shoe-bearing members slidably positioned on said bar in gripping relationship therewith and each of said shoe-bearing members being formed with a main portion of relatively thin, flat metal having a pair of integral projecting ears of the same thickness as said main portion, said ears being bent in a direction transverse to said bar and to said main portion to form a first and a second shoe contacting the bar on its upper and lower surfaces, respectively, and wherein the first shoe of one said shoe-bearing member is opposite the second shoe of the other shoe-bearing member and vice versa.

8. A locking control apparatus comprising a bar, means mounting said bar, a locking structure movable relative to said bar, and locking means for locking said structure against forces acting from one side of said bar tending to move said structure, said locking means releasing said structure for movement by forces acting from the other side of said bar, said locking means comprising a pair of shoe-bearing members slidably positioned on said bar in gripping relationship therewith and wherein each of the shoe-bearing members has a first shoe and a second shoe contacting said bar on opposite surfaces thereof, and wherein the shoes of the respective shoe-bearing members are diagonally oppositely disposed from one another, said shoe-bearing members being positioned to at least partially overlap one another, the first shoe of one said shoe-bearing member being in a directly opposite position relative to said bar from the second shoe of the other shoe-bearing member, each said shoe-bearing member being formed of an integral piece of flat metal, each said shoe being an integral extension of its respective shoe-bearing member bent transversely of said bar.

References Cited in the file of this patent

UNITED STATES PATENTS

| | | |
|---|---|---|
| 771,490 | Palmer | Oct. 4, 1904 |
| 2,664,015 | Moore | Dec. 29, 1953 |
| 2,703,499 | Reid | Mar. 8, 1955 |
| 2,802,374 | Reid | Aug. 13, 1957 |

FOREIGN PATENTS

| | | |
|---|---|---|
| 19,972 | Great Britain | Apr. 5, 1906 |